United States Patent
Channegowda

(10) Patent No.: US 9,853,758 B1
(45) Date of Patent: Dec. 26, 2017

(54) SYSTEMS AND METHODS FOR SIGNAL MIXING

(71) Applicant: Harman International Industries, Incorporated, Stamford, CT (US)

(72) Inventor: Vinod Channegowda, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/192,687

(22) Filed: Jun. 24, 2016

(51) Int. Cl.
*H04B 1/00* (2006.01)
*H04H 60/04* (2008.01)
*G06F 3/16* (2006.01)
*G06F 3/01* (2006.01)

(52) U.S. Cl.
CPC ............ *H04H 60/04* (2013.01); *G06F 3/017* (2013.01); *G06F 3/165* (2013.01)

(58) Field of Classification Search
CPC . G06F 3/01; G06F 3/011; G06F 3/017; G06F 3/02; G06F 3/16; G06F 3/165; H04H 60/04; G10L 15/25
See application file for complete search history.

(56) References Cited

U.S. PATENT DOCUMENTS

| | | | |
|---|---|---|---|
| 8,831,681 B1* | 9/2014 | Paiss | H04M 1/6041 348/36 |
| 2007/0136071 A1* | 6/2007 | Lee | G10L 15/25 704/270 |
| 2011/0224978 A1* | 9/2011 | Sawada | G06K 9/00221 704/231 |
| 2012/0259630 A1* | 10/2012 | Garg | G10L 13/033 704/233 |
| 2012/0300022 A1* | 11/2012 | Kaneko | G08B 13/1672 348/36 |
| 2012/0326970 A1* | 12/2012 | Wang | G06F 3/167 345/156 |
| 2014/0334682 A1* | 11/2014 | Lee | G10L 15/25 382/103 |
| 2015/0161992 A1* | 6/2015 | Jung | G10L 15/083 704/251 |
| 2016/0148616 A1* | 5/2016 | Takayanagi | G10L 15/32 704/235 |
| 2016/0189733 A1* | 6/2016 | Vasilieff | G10L 25/78 348/77 |
| 2016/0343389 A1* | 11/2016 | Chiou | G10L 25/57 |

* cited by examiner

*Primary Examiner* — Thang Tran
(74) *Attorney, Agent, or Firm* — McCoy Russell LLP

(57) ABSTRACT

Systems and methods for a signal mixing device are provided. An example method includes generating a mixing request during a live performance based on sensed mouth movement when sensed audio from the mouth is less than a threshold. In such an example method, the sensed mouth movement may be generated from a sensor mounted separately from an audio sensor of a microphone, and may be displayed at a mixing console during the live performance.

20 Claims, 10 Drawing Sheets

SYSTEMS AND METHODS FOR SIGNAL MIXING

FIELD

The disclosure relates to the field of signal mixing system, and in particular to the integration of silent sound technology with signal mixing system.

BACKGROUND

In live performances, sound engineers mix the sound from several sources, such as sounds from instruments (e.g., drum, guitar, piano, and the like) and voices, using a mixing console. Typically, the sound engineer may mix the audio signal for the audience, and may additionally mix the sound that the artistes or performers hear on stage via a stage monitor system. The artistes may have personalized monitors to listen to their own instrument/voice in conjunction with sound from the other artistes and/or instruments. When an artiste on stage needs a change in the personalized audio mix, the artiste may signal to the sound engineers by gesture or hand movement indicating the type of change desired. For example, if a drummer wants a guitar volume in his/her audio mix to be increased, the drummer may wave his hands to grab the attention of the sound engineer, and then may point to the guitar artiste, and then follow it up with a finger pointing upwards. The sound engineer watching the sequence of hand gestures performed by the drummer, may accordingly change the audio mix sent to the drummer with increased guitar volume, for example. In this way, the artistes on stage may be able to communicate with the sound engineers who are off-stage.

SUMMARY

Embodiments are disclosed for an example method of presenting feedback of mixing requests via a signal mixing device, the method comprising generating a mixing request during a live performance based on sensed mouth movement when sensed audio from the mouth is less than a threshold.

Embodiments are also disclosed for an example signal mixing device comprising an audio interface configured to be coupled to one or more audio detection devices for receiving sound signals from each of the one or more audio detection devices, a sensor interface configured to be coupled to one or more sensors, the one or more sensors detecting user movement corresponding to a message mouthed by a user, a processor, a sensor processing unit comprising instructions executable by the processor to determine a mixing request from the user corresponding to the message mouthed by the user, the mixing request being determined based on signals received from the one or more sensors, an output interface configured to be coupled to one or more first output devices and one or more second output devices, the output interface receiving feedback signals from the sensor processing unit indicating the mixing request for presenting the mixing request via the one or more first output devices, and the output interface receiving the sound signals from each of the one or more audio detection devices for outputting via the one or more second output devices, and a mixing interface comprising one or more user inputs for selecting adjustments to signals output by the one or more second output devices based on the mixing request, the mixing interface coupled to the output interface and configured to transmit instructions indicating the adjustments to the signals output by the one or more second output devices.

Embodiments are also disclosed for an example signal mixing device comprising an audio interface configured to be coupled to a plurality of audio detection devices for receiving sound signals from each of the plurality of audio detection devices, each of the plurality of audio detection devices being associated with a sound source, a sensor interface configured to be coupled to a plurality of sensors, each of the plurality of sensors detecting user movement corresponding to a message mouthed by an associated user, a processor, a sensor processing unit comprising instructions executable by the processor to determine a mixing request from each of a plurality of users, for each user of the plurality of users, the mixing request for that user being determined based on signals received from the one or more sensors associated with that user, and the sensor processing unit further comprising instructions executable to prioritize each of the mixing requests from the plurality of users based on one or more of a requested adjustment indicated by the mixing request, a user providing the mixing request, and a target of the requested adjustment for the mixing request, an output interface configured to be coupled to one or more first output devices and one or more second output devices, the output interface receiving feedback signals from the sensor processing unit indicating the mixing request for each of the plurality of users for presenting the mixing request via the one or more first output devices according to the prioritization of the mixing requests, and the output interface receiving the sound signals from each of the one or more audio detection devices for outputting via the one or more second output devices, and a mixing interface comprising one or more user inputs for selecting adjustments to signals output by the one or more second output devices based on each of the mixing requests, the mixing interface coupled to the output interface and configured to transmit instructions indicating the adjustments to the signals output by the one or more second output devices.

BRIEF DESCRIPTION OF THE DRAWINGS

The disclosure may be better understood from reading the following description of non-limiting embodiments, with reference to the attached drawings, wherein below.

DETAILED DESCRIPTION

During live performances, the artistes on stage may communicate personalized audio feedback requests to sound engineers who are typically off-stage. The artistes may perform hand waving gestures to communicate with the sound engineers. However, it may not be always feasible for the artistes to free their hands in order to perform the hand gestures to the sound engineers. As an example, drummers using both their hands for playing the drums may need to finish playing their part before waving to the sound engineers for a change in the sound mix. The present disclosure describes a system that integrates silent sound technology to audio detection devices (microphones, for example) used in live concerts to mitigate these issues. Silent sound technology detects lip movements, converts the movements into electrical and sound signals, and transmits the lip movements as sound signals. By integrating the silent sound technology with the microphones that the artistes use on stage, the artistes may be able to simply move their lips (e.g., mouth the words "increase volume", or "decrease volume", and the like), and the lip movements may be automatically analyzed and decoded into signals and/or messages that may then be transmitted to the sound engineers. In one example, the microphones may include a camera focused on the lips of the artiste. Any movement in the lips with no accompanying sound may indicate that the artiste is only mouthing words and not singing or talking. During such lip movements, images of the lip movements taken from the camera may be processed and converted to audio signals that may then be relayed to the sound engineers. In this way, the artistes may be able to communicate with the sound engineers without using distracting hand waving gestures.

Figure 1A:
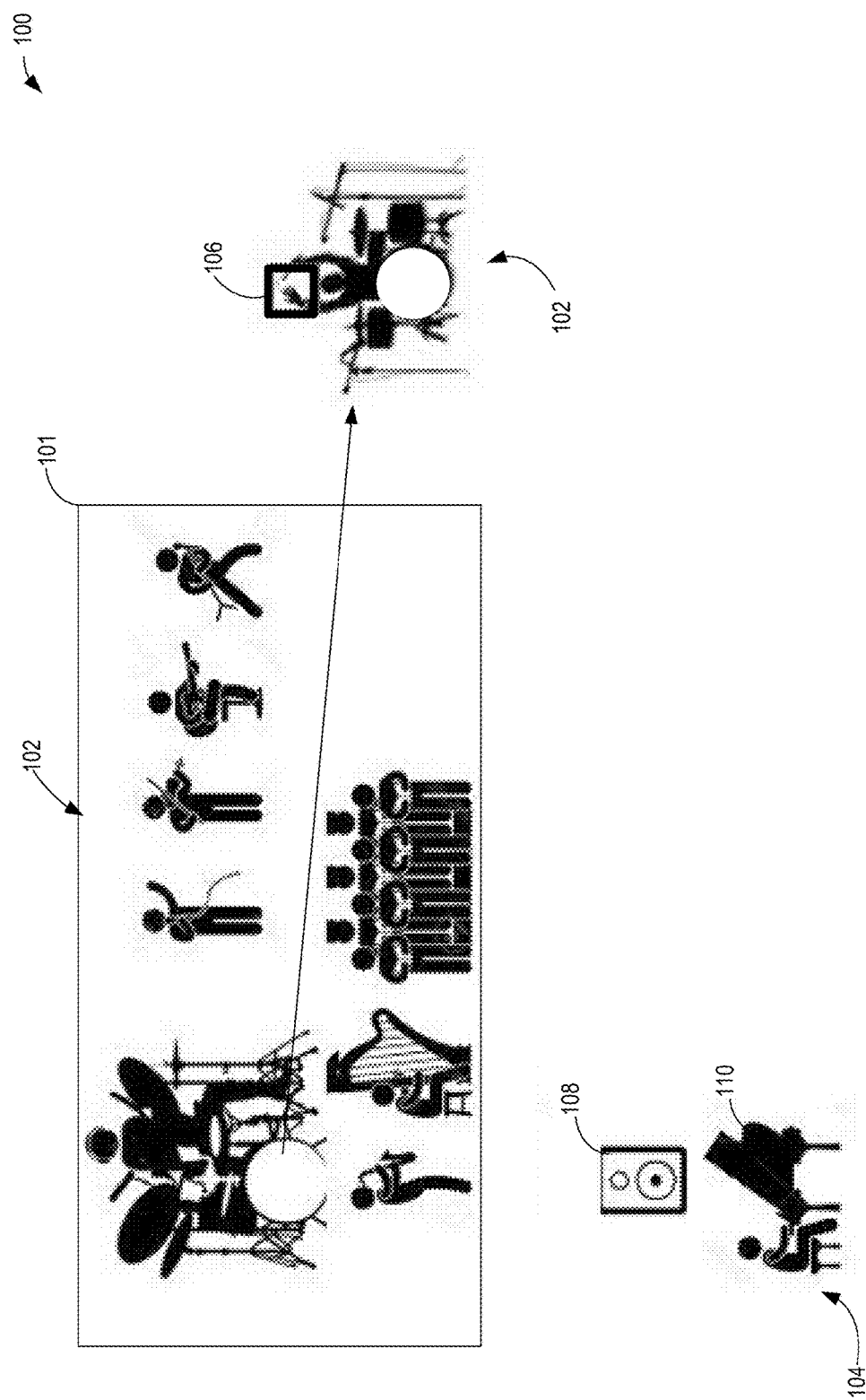
FIG. 1A shows a sound mixing environment showing users/artistes communicating with a mix engineer in accordance with one or more embodiments of the present disclosure.

FIG. 1A shows an example sound mixing environment with several artistes 102 performing on a stage 101, and a mix or sound engineer 104 mixing the audio signals using a console 110. As illustrated, the sound engineer 104 is off-stage. In some examples, the artistes 102 may include one or more of drummers, guitarists, violinists, vocalists, saxophonists, harpists, and the like. When an artiste sings or plays an instrument, an audio or sound signal is generated. The sound signal from each of the artistes is sent as an array of inputs to the console 110. The console 110 is a mixer that combines or meshes the array of inputs from the artistes into several controllable outputs. Using the console 110, the mix engineer 104 may be able to combine the audio signals to change the volume level, timbre, tone, and/or dynamics of the audio signals, and the like to produce combined output signals. As an example, a sound engineer such as a front of house engineer may be able to use the console to combine the audio signals from the artistes on stage to generate the output signals for the audience. As another example, a sound engineer such as a foldback or monitor engineer may use the console to mix sounds that the artistes hear on the stage. Particularly when the instruments and the voices of artistes on stage are amplified, individual artistes may need personalized audio feeds to be able to hear the instruments or voices above the amplified sounds from different instruments on stage. In some cases, the front of house engineer may be able to provide personalized audio feeds for the artistes on stage.

Typically, the sound engineers are stationed at a remote location that is distanced from the stage. As an example, the front of house engineer may operate from the middle of the audience, and the monitor engineer may operate from the wings just off-stage.

It is common for the artistes on stage to communicate their audio signal preferences via hand gestures. An example hand gesture 106 performed by one of the artistes 102 (e.g., drummer) on stage is shown in FIG. 1A. In order for the drummer to communicate with the sound engineer 104, the drummer has to stop playing the drums, raise the hands, and wave out the gesture 106. There are several issues with such a form of communication between the artiste and the sound engineer. Firstly, the drummer has to stop playing the drums in order to communicate to the sound engineer. Likewise, a guitarist who needs both hands to play the guitar can signal the audio preferences to the sound engineer only when the guitar is not being played. Secondly, the hand waving gestures 106 may be distracting for the fellow artistes, and the audience. Thirdly, when several artistes wave their hands at the same time, it may be very confusing for the sound engineer. Further, it may be difficult for the sound engineer to adjust the mixing to meet the sound preferences for all the artistes at the same time.

In order to address the above-described issues, the present disclosure provides systems and methods for integrating silent sound technology with the microphones used in such sound mixing environments. Silent sound technology refers to the system that detects lip movements, converts the movements into electrical and sound signals, and transmits the movements as sound signals. Thus, without performing distracting hand waving gestures, the artistes may be able to mouth the audio preference, and the lip movements may be converted to audio signals and relayed to the sound engineer 104 via speakers 108. In some examples, the lip movements may be transformed into visual signals that may be presented via a display to the sound engineer 104.

Silent sound technology enables communication to take place when an audible acoustic signal is unavailable. The technology relies on sensors to pick up the lip movement. Examples of sensors include ultrasound probes, electromyographic sensors, cameras, and the like. The sensors may be hand-held by the user or mounted directly on the user. As an example, a camera may be integrated with a microphone, and may be hand-held by the user. As such, the camera may be powered by a power unit that also powers the microphone, or in some cases, may be powered by a separate powered unit. As another example, electromyogrpahic probes may be mounted on the user. As such, the electromyographic sensors are probes that monitor tiny muscular movements that occur when a person speaks and converts the muscular movements into electrical signals. The electromyographic sensors may be powered by a designated power unit, for example. The signals from the sensors are converted to analog signals using a signal mixing device as shown below.

Figure 1B:
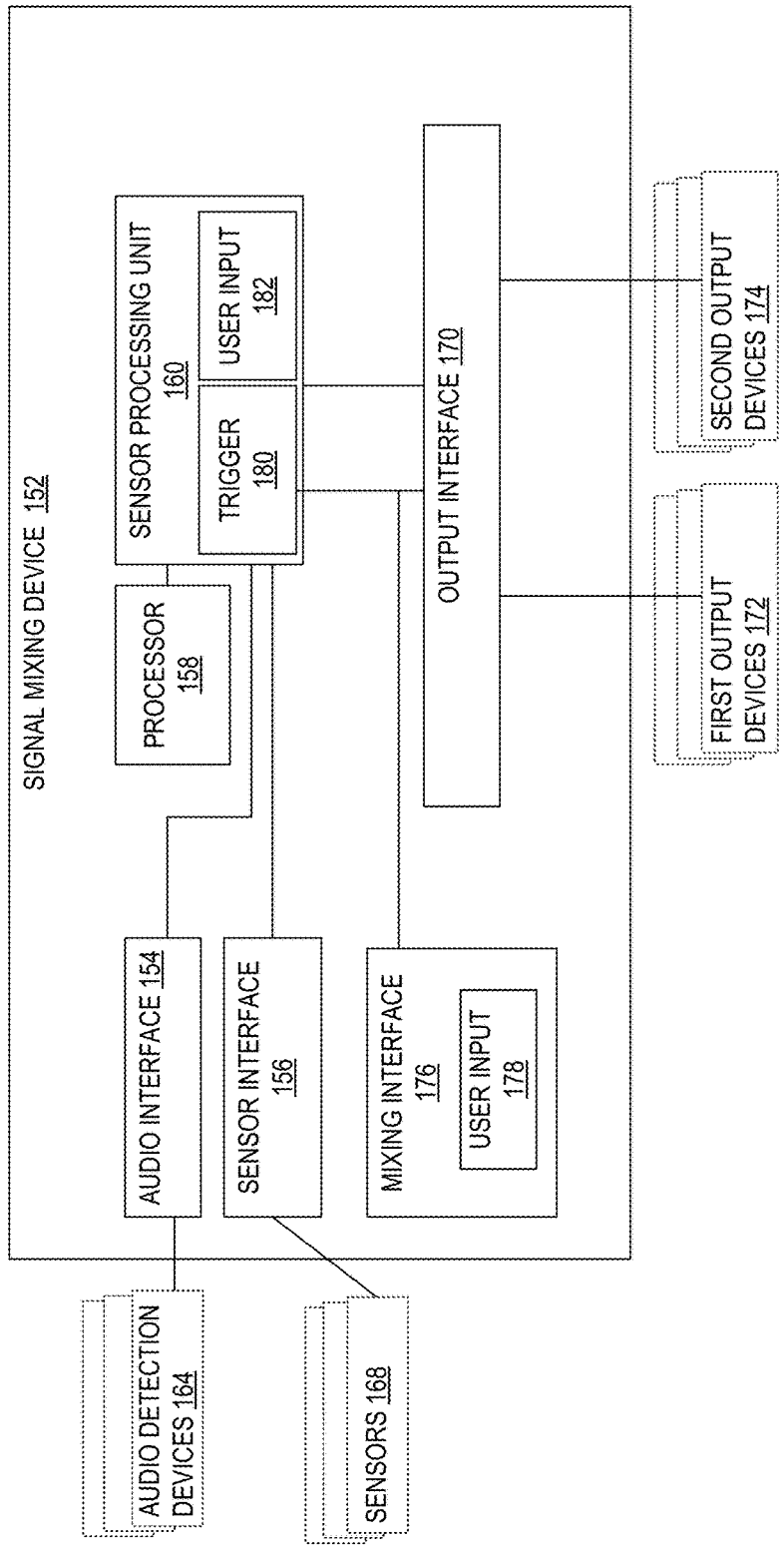
FIG. 1B shows a block diagram of an example signal mixing device in accordance with one or more embodiments of the present disclosure.

Turning to FIG. 1B, an example signal mixing device 152 is shown. The signal mixing device 152 includes an audio interface 154, a sensor interface 156, a processor 158, a sensor processing unit 160, an output interface 170, and a mixing interface 176. The audio interface 154 may be coupled to one or more audio detection devices 164 (e.g., microphones). The audio detection devices 164 are capable of detecting sound signals from a sound signal source (e.g., an instrument, a vocalist, etc.) and generating and/or transmitting a sound signal corresponding to the detected sound signal. An example of an audio detection device is a microphone, which picks up audio signal frequencies that are within the audible range of humans. Other examples of audio detection device includes ultrasound detector that detects audio signal frequencies that not within the audible range of humans.

As an example, during a performance, there may be several microphones on the stage, each microphone picking audio signals from one or more users (hereafter interchangeably referred to as artistes). In such an example, the audio interface 154 may be coupled to each of the microphones that are present on the stage. As another example, during a performance, there may be several artistes on and off-stage. The audio interface 154 may be capable of receiving sound signals from each of the microphones that are on and off-stage.

The sensor interface 156 is coupled to one or more sensors 168. Examples of sensors include cameras, electromyographic sensors, ultrasound probes, and the like. As such, the sensors may be configured to detect user movements corresponding to a message mouthed by the user. The sensor processing unit 160 may receive the output of the one or more sensors 168 and may determine a mixing request based on the output of the one or more sensors 168.

For example, the electromyographic sensors are probes that monitor tiny muscular movements that occur when a person moves his/her mouth, and convert the muscular movements into electrical signals. The electromyographic sensors may be mounted in the neck region of a user. When the user mouths a silent message, the electromyographic sensors detect movements in the neck, and the sensor processing unit 160 may convert the neck movements into detectable message. Thus, even when the person is not speaking but just mouthing words, the electromyographic sensors may be able to detect the message mouthed by the person based on the movements in the neck muscle.

Figure 2:
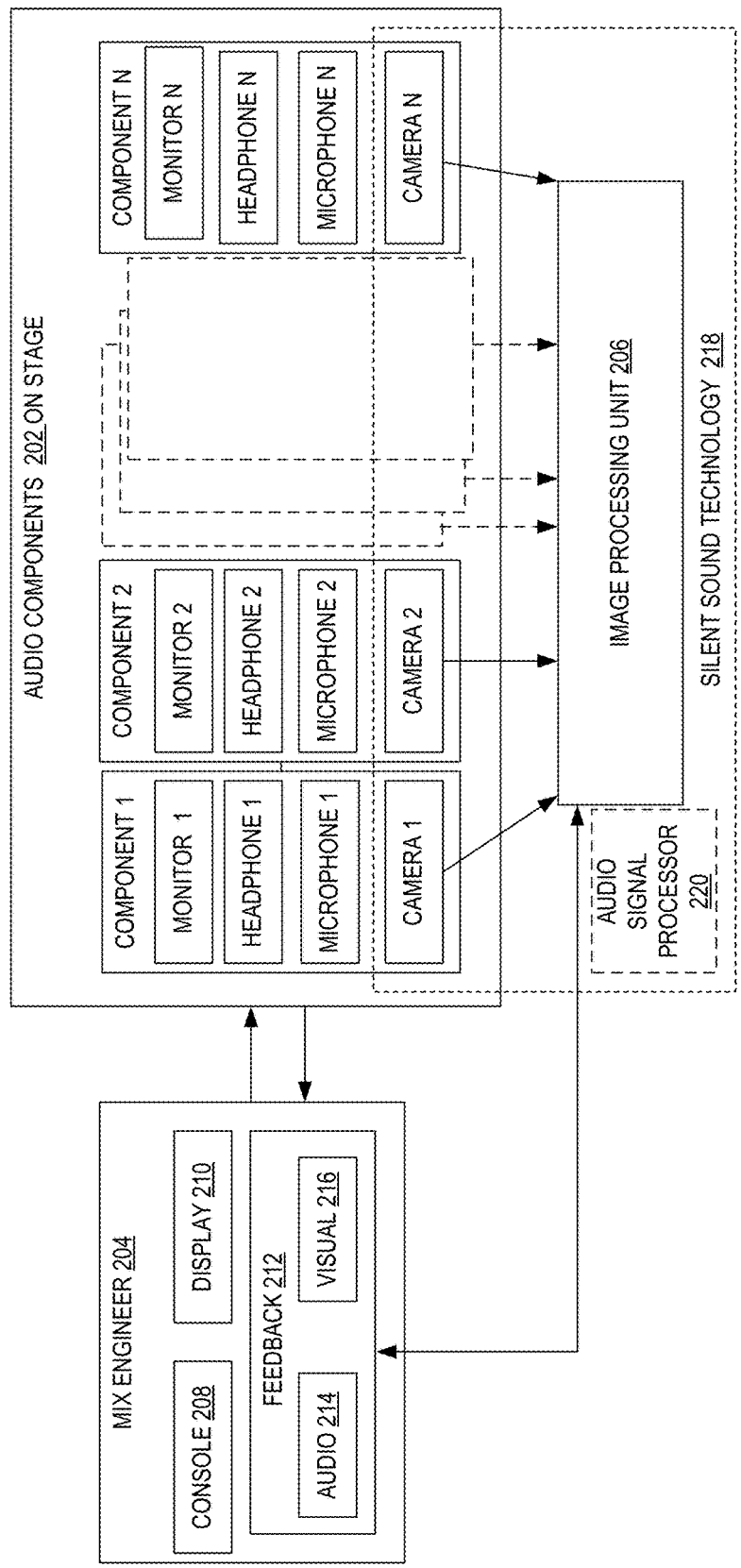
FIG. 2 shows a block diagram of an example sound mixing system including a silent sound system in accordance with one or more embodiments of the present disclosure.
Figure 3:
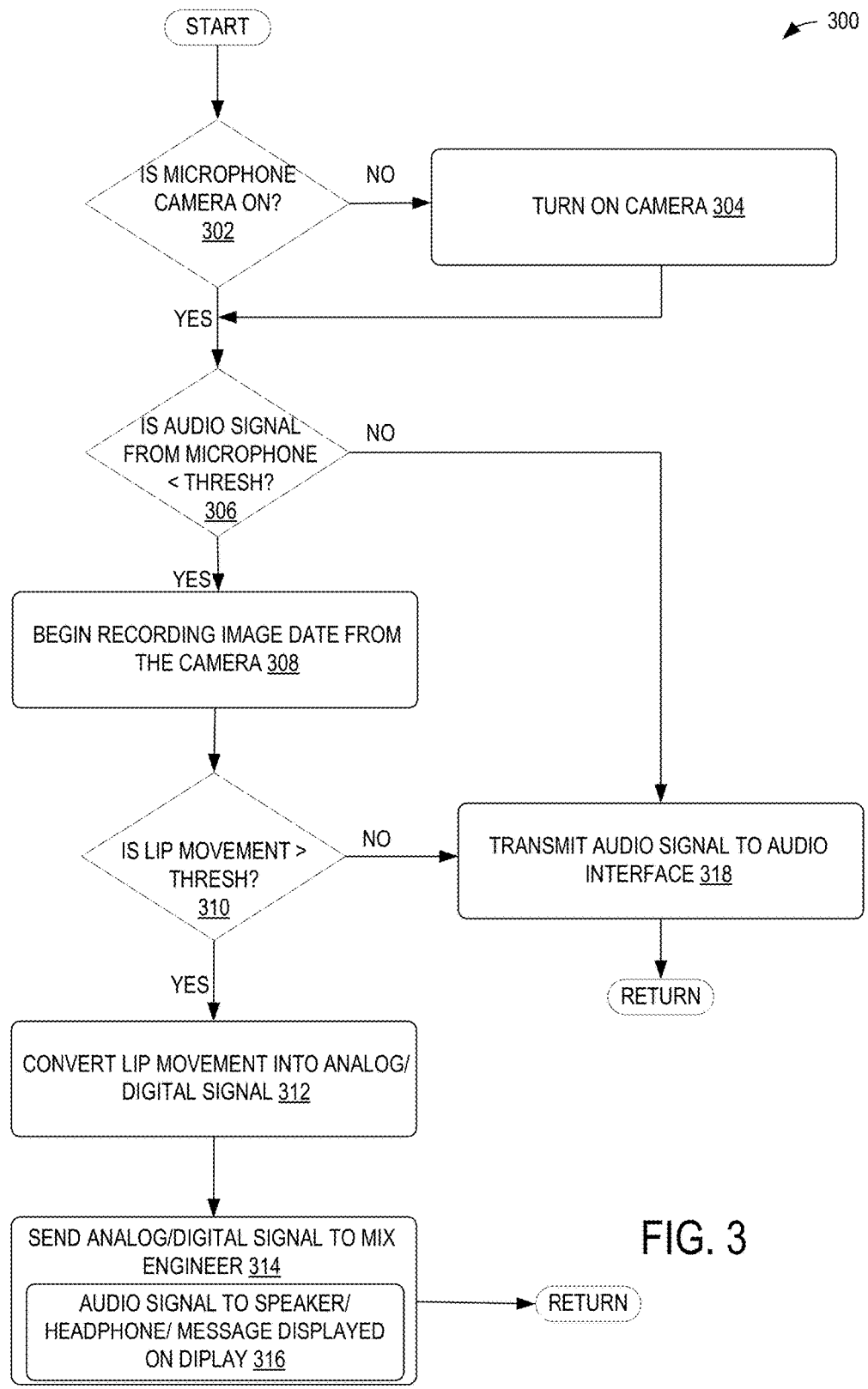
FIG. 3 shows a flow chart of an example method for transmitting lip movements as analog signals to the mix engineer in accordance with one or more embodiments of the present disclosure.
Figure 4:
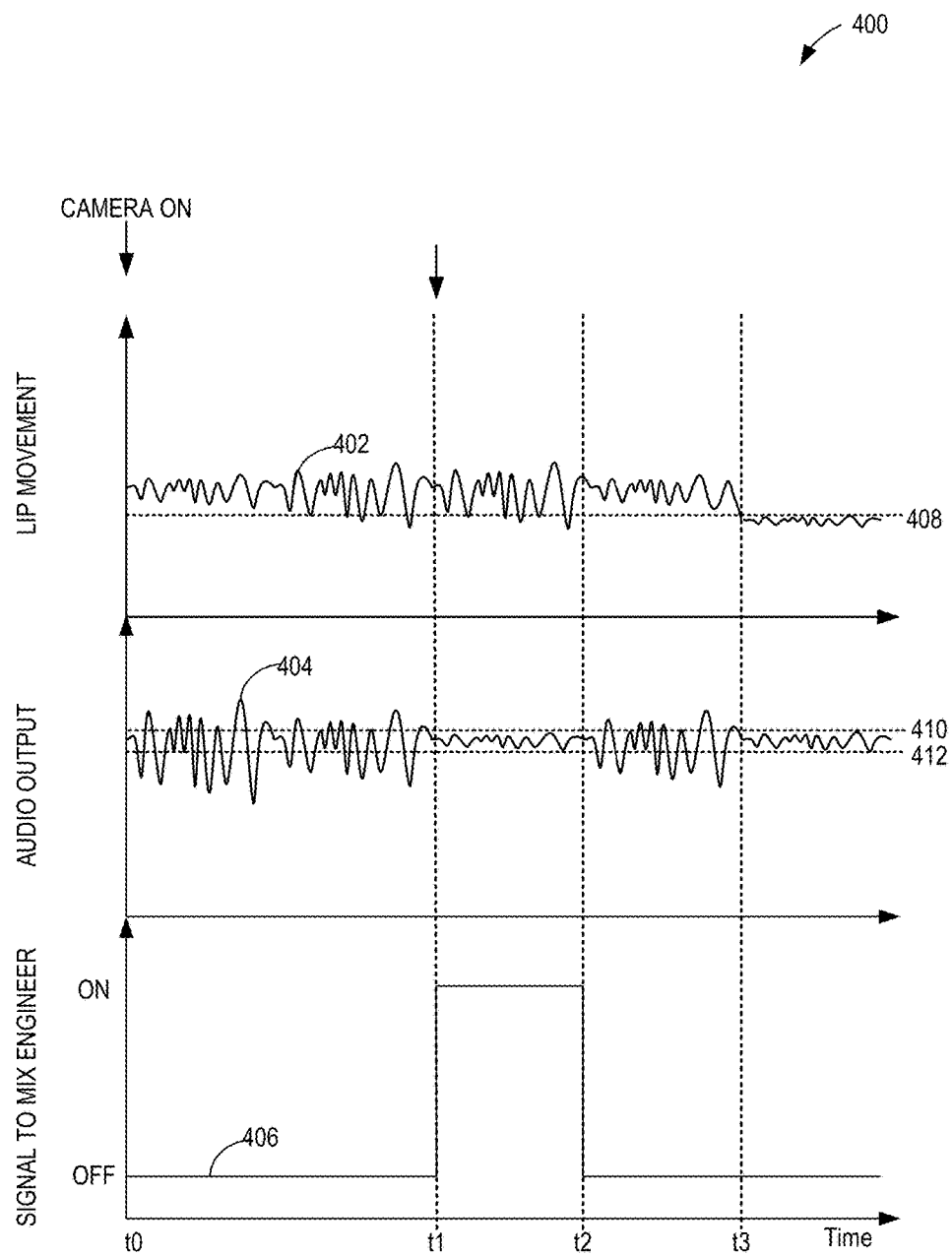
FIG. 4 shows an example relationship between lip movement, an audio output of a microphone, and the signal sent to the mix engineer in accordance with one or more embodiments of the present disclosure.

As another example, sensors such as cameras may be used to image the lip/mouth movements. For example, the cameras may be focused on the lips/mouth/mouth region of the user. When the user moves the lips, the camera captures sequential images of the lip movements. The sensor processing unit 160 may receive the images and further convert the images to electrical signal, which can then be converted into detectable message. In this way, when an artiste mouths a mixing request, the mixing request may be detected by the one or more sensors 168, and the mixing request may be decoded by the sensor processing unit 160. In some example embodiments, the sensors 168 may be embedded in or coupled to the audio detection devices 164. Cameras may be embedded in or coupled to microphones, as shown in FIG. 2. In some examples, the sensor processing unit 160 may be able to selectively determine the mixing request from the user based on one or more of a trigger 180, and a user input 182. For example, the user turning on a camera may be construed as a trigger. When the user turns on the camera, the sensor processing unit 160 may begin analyzing the images from the camera, for example, to determine the mixing request. In another example, the signal processing unit 160 may automatically begin analyzing sensor data from a selected sensor when an audio output or amplitude of the sound signal from the one or more audio detection devices 164 changes. For example, when the amplitude of the sound signal from a microphone drops below a threshold, while the signal from the sensor such as camera remains above a threshold, then the sensor processing unit 160 may start analyzing the signals from the camera to determine the mixing request as shown in FIGS. 3 and 4.

Figure 5:
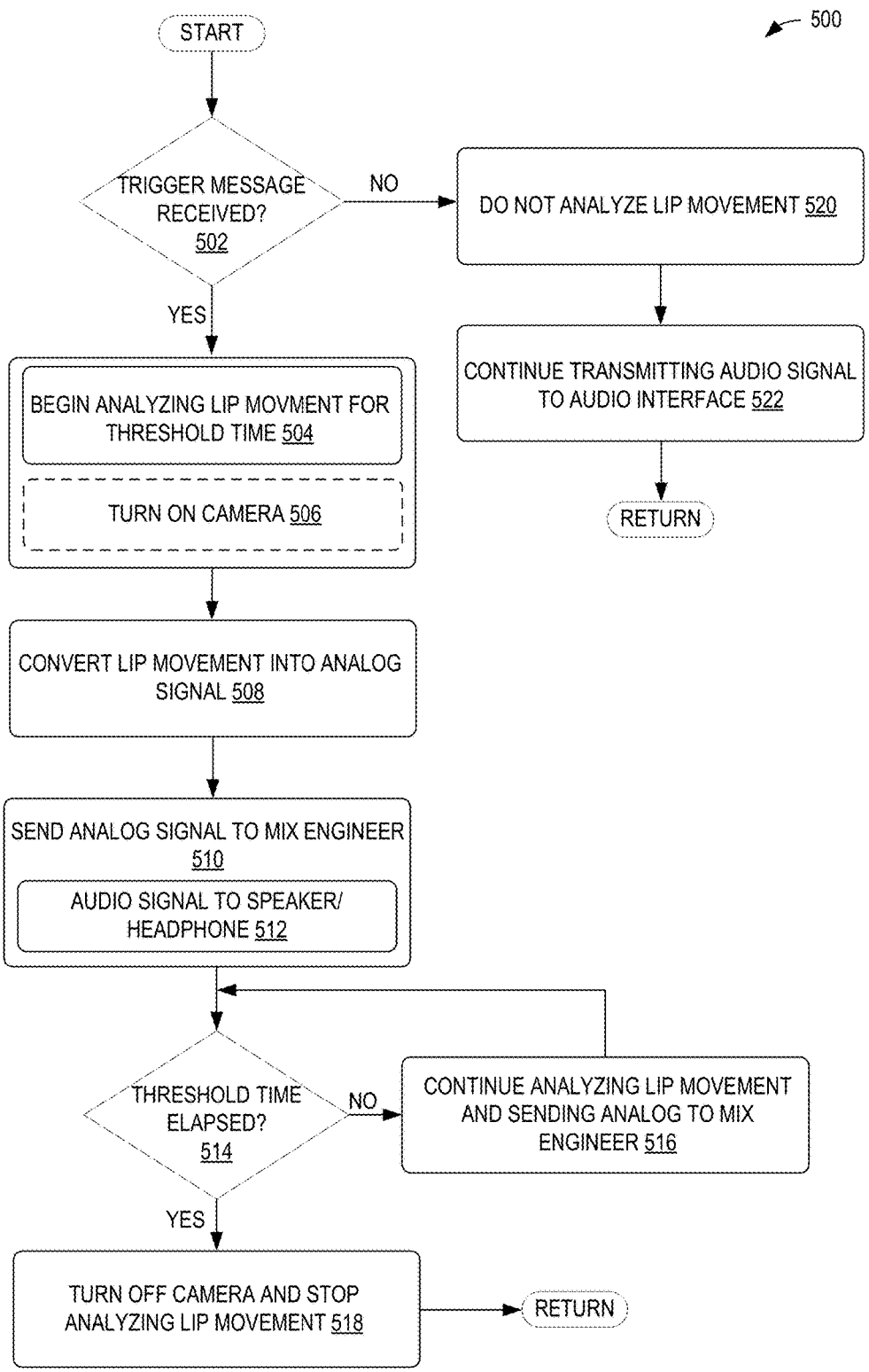
FIG. 5 shows a flow chart of an example method for processing the images from a camera upon receiving a trigger, and further transmitting the analyzed images as analog signals to the mix engineer in accordance with one or more embodiments of the present disclosure.
Figure 6:
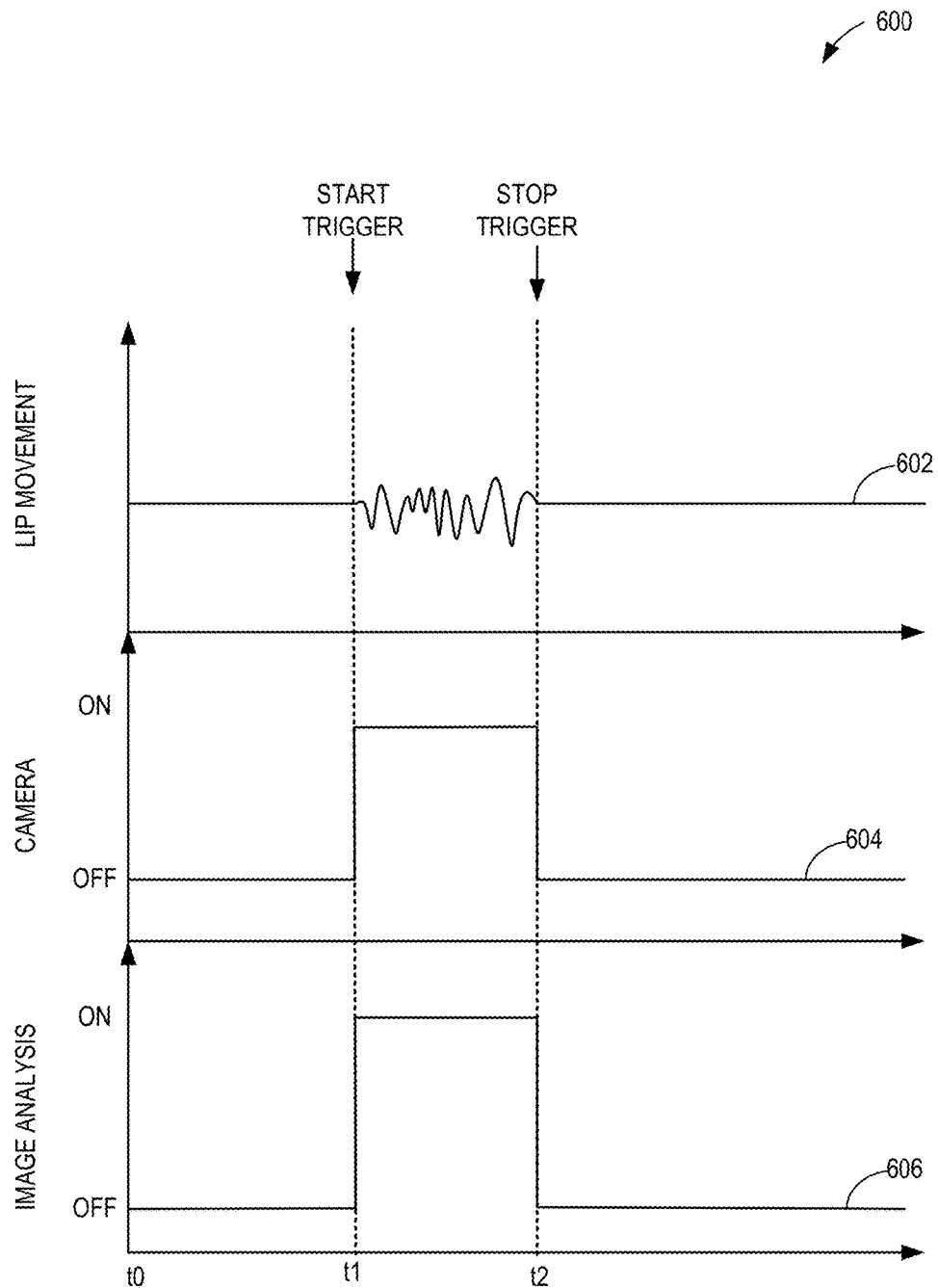
FIG. 6 shows an example relationship between trigger commands, and analysis of the lip movements, in accordance with one or more embodiments of the present disclosure.

The sensor processing unit 160 may additionally include instructions executable by the processor 158 to operate each of the one or more sensors 168 based on a trigger 180. For example, when a user snaps a finger, the sensor processing unit may transmit an instruction to turn on a camera coupled to a microphone to start recording images of the lip movements. Examples of such controls are shown in FIGS. 5 and 6.

The sensor processing unit 160 may be able to determine the mixing request by performing analysis on the sensor data. For example, the sensor processing unit 160 may include a memory, and a database of user movements may be stored in memory. The analyzed data may be compared to the database of user movements to deduce the mixing request from the user. The mixing request from the user may be one or more of words, phrases, and phonemes.

The output interface 170 may be coupled to one or more first output devices 172, and one or more second output devices 174. The output interface 170 may receive feedback signals from the sensor processing unit 160 indicating the mixing request and may present the mixing request via the one or more first output devices 172. Examples of the first output devices 172 include speakers, headphones, monitors, displays, and the like. Although illustrated as off-board the signal mixing device, the first output devices 172 may be integrated with and/or coupled to a surface of the signal mixing device. For example, a mixing request such as "increase volume" from an artiste on stage may be presented to an operator of the signal mixing device, such as a sound or mix engineer, via a speaker and/or displayed to the engineer via a display of the signal mixing device. Herein, the artiste may mouth the words corresponding to the mixing request, sensors such as cameras may detect the lip movements, and the sensor processing unit may process and convert the images into analog signals. The analog signals may then be sent to a speaker and/or display positioned proximate to the mix engineer, for example.

The mixing interface 176 may make adjustments to signal output by the one or more second output devices 174 based on the received mixing request. Examples of mixing interface may include user interface controls included on a console, a control panel, a mixing board, a mixer, and the like. The one or more second output devices may include in-ear monitors, stage monitors, wedge monitors, speakers, audience-facing speakers, and the like. For example, mixing request received from an artiste on stage may be relayed to a mix engineer via the one or more first output devices 172, and the mix engineer may perform the requested mixing for the signal output of the one or more second output devices 174 using the mixing interface 176. The changed signals may be then be sent back to the one or more second output devices 174.

Figure 7:
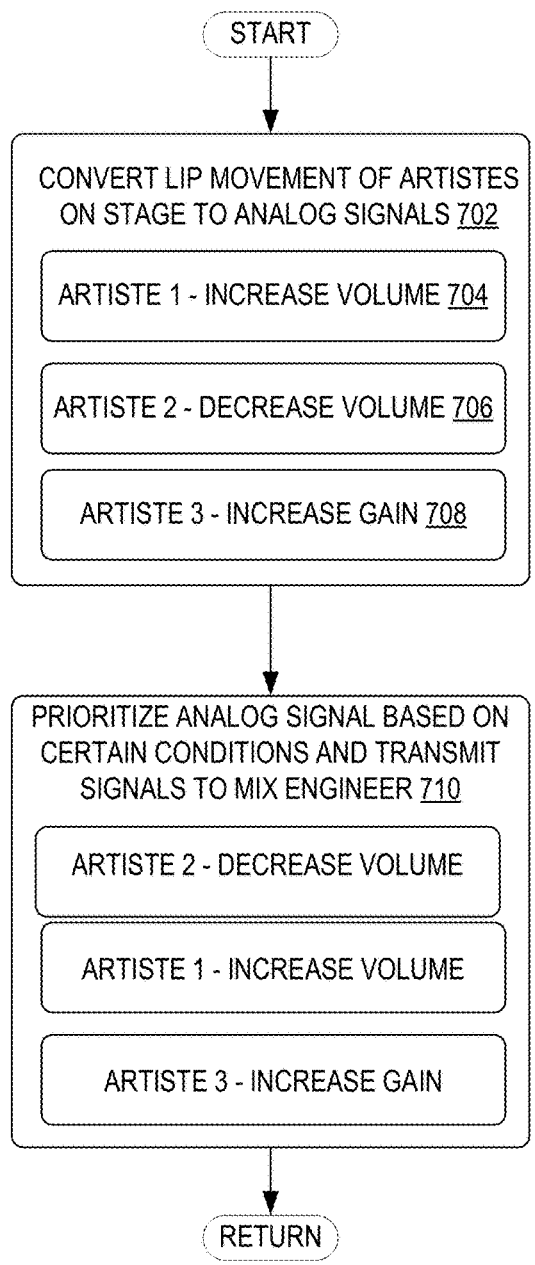
FIG. 7 shows a flow chart of an example method for receiving signals from multiple artistes, and prioritizing delivery of the signals to the mix engineer in accordance with one or more embodiments of the present disclosure.
Figure 8:
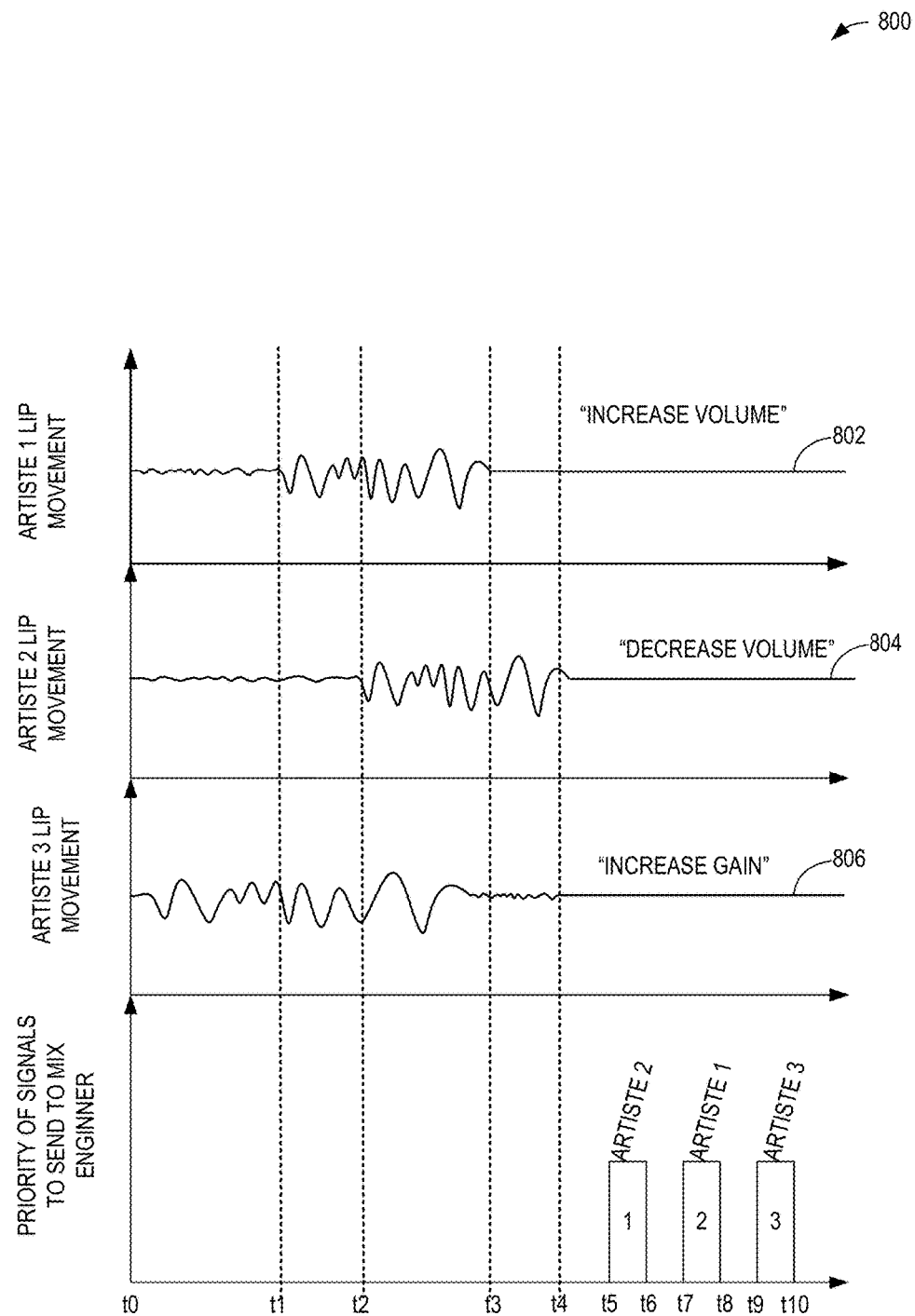
FIG. 8 shows an example relationship between signals received from multiple artistes, and delivery of signals to the mix engineer in accordance with one or more embodiments of the present disclosure.

When receiving signals from multiple users using multiple sensors, the sensor processing unit 160 may be further configured to receive the signals, identify the origin of each of the signal, convert each of the signal into a separate mixing request, and further prioritize each of the mixing request to be delivered to the mix engineer, as shown in FIGS. 7 and 8.

As discussed earlier, the sensors may include one or more of cameras, ultrasound probes, electromyographic sensors, and the like. An example embodiment where cameras are used as sensors that users/artistes/performers use on stage is shown in FIG. 2. Turning to FIG. 2, an example sound mixing system 200 in accordance with one or more embodiments of the present disclosure is shown. The sound mixing system 200 may be an example of the signal mixing device 152 of FIG. 1B.

The sound mixing system 200 includes audio components 202 that are located on a stage, for example. As such, each artiste and each instrument on stage capable of generating a sound signal is represented as audio components 202. For example, component 1 may be a guitar, component 2 may be a vocalist, and component 3 may be a drum, and so on. The audio signal from each of the components 1 through N may be picked up by microphones 1 through N positioned closer to the components, and sent to a mix or sound engineer 204. Mix engineer 204 may be an example of the mix engineer 104 of FIG. 1A. Mix engineer 204 may be an audio engineer such as a front of house (FOH) sound engineer, foldback or monitor engineer, recording engineer, sound engineer, and the like.

Typically, the mix engineer 204 mixes or combines the signals from the audio components 202 (components 1 through N such as guitars, bass, drums, vocals, and the like) using a console 208. The console 208 may also be referred to as a control panel, a mixing board, or a mixer. For example, the console 208 may include one or more components of the signal mixing device 152 of FIG. 1B (e.g., the mixing interface 176).

As described previously, the mix engineer 204 such as FOH engineer may operate from the middle of the audience, mix the audio signals from the audio components 202, and generate music for the audience. The mix engineer 204 such as a monitor engineer may operate from the wings, mix the audio signals from the audio components 202 to deliver personalized audio feed to each of the artistes on stage. In some examples, the FOH engineer may deliver personalized feed to the artistes on stage. As such, the personalized audio feed may be delivered to each of the artistes via one or more of a monitor, and a headphone. Thus, each component (components 1 through N) of the audio components 202 includes a headphone (headphones 1 though N) and/or a monitor (monitors 1 though N).

Some example tasks that the mix engineer 204 performs include adjusting levels to individual monitors (monitors 1 through N of the audio components 202), isolating each signal to give the artistes just the right amount of snare, kick drum, lead vocals, or rhythm guitar, and the like. For example, each artiste may have his or her own preferences, which may be communicated to the mix engineer 204 during a performance.

During a performance when multiple artistes are performing on the stage, the mix engineer 204 receives signals from the artistes and adjusts audio levels based on the noise in the venue from the audience and bounce-back from the stage arrays. Typically, the mix engineer 204 and the artistes on stage communicate using hand signals and gestures to ensure that the musicians are getting the proper sound. However, as discussed earlier, the hand waving gestures may be distracting, may be misleading (e.g., it may not be clear if the artiste is waving to the mix engineer or the crowd), and further may be difficult to perform by the artistes when they are playing the instruments, for example. In addition, when several artistes are requesting a change their respective audio feed at the same time, it may be difficult for the sound engineer to understand and prioritize the signals and make the requested adjustments.

In the sound mixing system 200, silent sound technology 218 may be integrated with the audio components 202. As an example, sensors may be coupled to the components 1 through N, each sensor capable of reading lip movement of the artiste using the particular component. The silent sound technology 218 may include and/or be coupled to one or more components of the signal mixing device 152 of FIG. 1B.

In an example embodiment, cameras 1 through N may be integrated with the microphones 1 through N that are placed in front of the artistes. In another example embodiment, the cameras may be integrated with the instrument. In yet another example, a plurality of cameras may be positioned in front of the stage, wherein each camera points towards a specific artiste on stage. For example, the cameras may include one or more of traditional visible light cameras, thermal cameras, infrared cameras, depth cameras, and the like. In some examples, multiple cameras, or cameras including multiple image detection technologies, may be selectively employed based on parameters of the environment (e.g., amount/intensity of ambient light, size of stage, etc.). For example, a visible light camera may be utilized while ambient light is above a threshold intensity (e.g., when a threshold number of the stage and/or house lights are on), while an infrared and/or thermal camera may be utilized while ambient light is below the threshold intensity (e.g., when a threshold number of the stage and/or house lights are off). In this way, the system may switch from capturing images via the visible light camera to capturing images via the thermal and/or infrared camera dynamically responsive to changes in the environment.

Wherever positioned, the cameras are focused onto the lips of the artistes, for example. When an artiste moves his/her lip but there is no audible sound from the lip, then the images from the camera are sent to the image processing unit 206 where the captured images are analyzed. In some examples, the cameras may be triggered to start recording during periods when there is lip movement with no accompanying sound (FIGS. 3-6). In some more examples, the camera may be continuously recording; however, the images may be analyzed by the image processing unit 206 when there is lip movement with no accompanying sound.

The image processing unit 206 analyzes the images from one or more cameras 1 through N, and converts the images into electrical signals. Analysis of the images may include one or more of analog image processing techniques, and digital image processing techniques. The image processing unit 206 may receive the image data from the cameras 1 though N, perform pre-processing on the received images, and extract features, perform image enhancement, and image interpretation. Additional analysis such as contrast enhancement, image rectifications, adjustments, and the like may be performed on the received images. By performing quantitative analysis on the image data, the image processing unit 206 may convert the image data into electrical signals.

The electrical signals may then be converted into audio and/or visual signals and sent as feedback 212 to the mix engineer 204. In one example, the lip movement of the artiste may be delivered as an audio signal 214 through a speaker positioned at or near the console 208 used by the mix engineer 204. In another example, the lip movement of the artiste may be delivered as a visual signal 216 in the feedback 212 from the image processing unit to the mix engineer 204. The visual signal 216 may be displayed to the mix engineer 204 using a display 210. In this way, the artistes on stage may communicate the audio preferences to the mix engineer without using distracting and cumbersome hand waving gestures.

For example, an artiste playing the guitar may prefer to have the volume of the vocalist to be increased, and have the drums volume to be decreased. The guitarist may mouth the words "Guitar increase volume, drum decrease volume". The camera focused on the lips of the guitarist may start capturing images, and may send the captured images to the image processing unit. The image processing unit may convert the received images into electrical signals. In one example, the electrical signals may be converted into audio signal including the message "Guitar increase volume, drum decrease volume" and relayed to the mix engineer via a speaker. The mix engineer may accordingly increase the volume of the vocalist and reduce the volume of the drums, and send the audio feedback to the guitarist. If the guitarist is satisfied, he may mouth "Good" which may then be relayed back to the mix engineer. However, if the guitarist is still not satisfied, he may continue to mouth messages to the mix engineer, which may be delivered as audio signals to the mix engineer.

In another example, the artiste may push a button on the microphone to turn ON the camera. Turning ON the camera may indicate a desire to communicate a personal preference to the mix engineer. The image processing unit may start analyzing the images when the camera is turned ON. In yet another example, the mix engineer may selectively turn ON the cameras pointing towards the different artiste. An LED light or other indicator on the microphone/camera(s) may turn ON or otherwise be activated indicating that the camera integrated with the microphone is ON, for example. The indicator may be positioned so as to be viewable by the mix engineer and/or one or more of the artistes. For example, the mix engineer may know that the drummer has an upcoming solo piece, and in anticipation, may turn ON the camera pointing towards the lips of the drummer. In order to turn ON the camera, the mix engineer may send signals to the image processing unit, which in turn may remotely turn ON the camera pointing towards the drummer. In this way, the artistes and the mix engineers may be in constant communication throughout the performance.

As such, the images that are converted into electrical signals may be transmitted as audio signals to the mix engineer. In another example, the electrical signals may be converted into a visual signal and displayed via the display to the mix engineer. The advantage of using the silent sound technology to communicate the audio preferences to the mix engineer is that the artiste no longer has to interrupt the playing of the instrument in order to wave the preferences to the mix engineer. Thus, the artiste may be able to continue playing the instrument without any interruptions or distractions.

The image processing unit 206 may optionally include an audio signal processor 220 that processes audio signals received from the microphones 1 though N. In some examples, the image processing unit 206 may receive audio signals from the console 208 of the mix engineer 204 and may be configured to perform comparisons on the audio level with respect to threshold levels. The audio signal processor 220 may be capable of analyzing the audio signals to subtract out the background and isolate the audio signals from each of the microphones. By comparing the audio level of the microphone with the threshold level, it may be possible to determine if there is any audio output from the microphone. If the audio level from a particular microphone is less that threshold, the image processing unit may be able to analyze the lip movement images and determine if the artiste is mouthing signals for the mix engineer. Accordingly, the image processing unit 206 may begin processing the image data from the cameras and convert the image data into audio and/or visual feedback for the mix engineer. In this way, the image processing unit 206 may be able to determine if a vocalist is singing or communicating his/her personal audio feed requests to the mix engineer.

Figure 9:
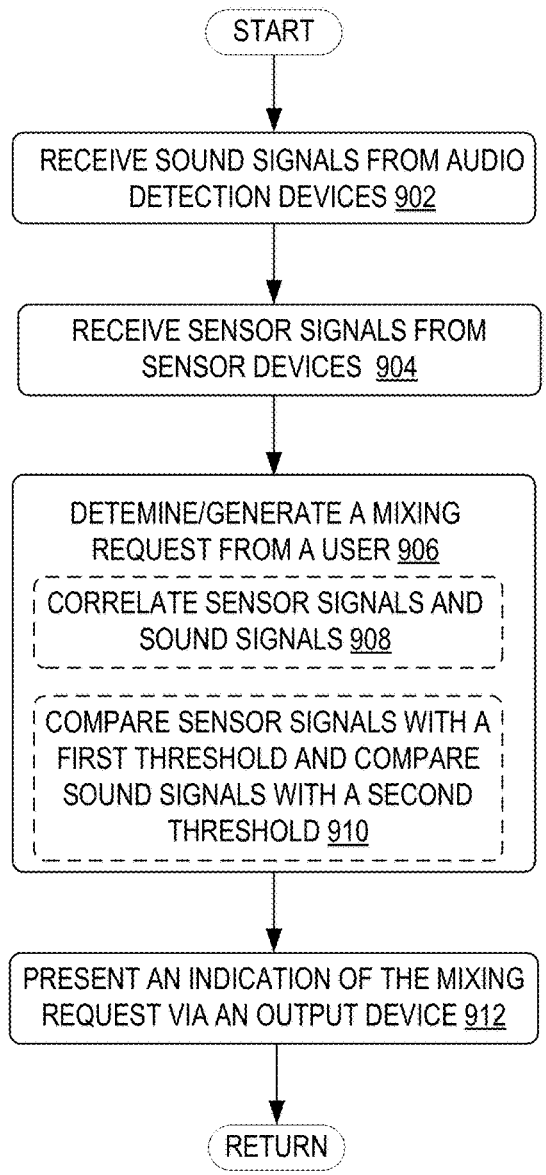
FIG. 9 shows an example method of presenting feedback of mixing requests via the signal mixing device in accordance with one or more embodiments of the present disclosure.

Turning now to FIG. 9, an example method for presenting feedback of mixing requests via a signal mixing device is shown. Instructions for carrying out method 900 and the rest of the methods 300, 500, and 700 included herein may be executed by a processor (processor 158 of FIG. 1B and/or sensor processing unit 160 of FIG. 1B, and/or image processing unit 206, and/or audio signal processor 220 of FIG. 2) based on instructions stored on a memory of the processor and in conjunction with signals received from sensors, audio detection devices, sensors of the silent sound technology, and the audio mixing system, such as the sensors described above with reference to FIGS. 1A, 1B, and 2.

Method 900 begins at 902, where sound signals from the one or more audio detectors (e.g. microphones) are received. Method proceeds to 904 where sensor signals from one or more sensor devices are received. In one example, the sensor devices may be coupled to the audio detectors such as the case when cameras are embedded in or coupled to the microphone. In another example, the sensors may not be coupled to the audio detectors, but may be positioned so that signals from each sensors are distinct. In yet another example, when an artiste moves around while performing on stage, cameras may be positioned around the stage, in addition to cameras focused on the lips. The method may include isolating the lip movement by subtracting the images from the cameras positioned on stage to remove the global movement of the artiste to isolate the lip movement. As such, the sensor devices may be operated based on a trigger command from the user. The user may mouth specific words, phrases, and phonemes to indicate a desire to communicate a mixing request. The user turning ON a camera coupled to the microphone may be construed as a trigger input.

Method proceeds to 906 where a mixing request from a user is determined. Some examples of mixing request include an indication of a requested change in volume, an indication of a sound signal to which the requested change in volume is to be targeted, an indication of a selected output device of the one or more output device (such as one or more second output devices 174 of FIG. 1B) for outputting the sound signal with the requested volume change. Determining the mixing request may optionally include correlating sensor signals received from the one or more sensor devices at 904 with the sound signals received from the audio detection devices at 902. Correlating the sensor signals and the sound signals may optionally include comparing the sensor signals with a first threshold, while simultaneously comparing the sound signals with a second, different threshold.

Consider an example situation when a user is singing into a microphone. Herein, a camera is coupled or embedded in the microphone and is further focused onto the lips of the artist. When the user is singing, the sound signal may be correlate with sensor signals, thus, an increase or decrease in the output waveforms of the sensor signals may correlate with the output waveform of the sound signals. Consider a first situation when the user is an opera singer. Herein, the opera singer may sing a note for a longer time. In such an example, the output waveform from the sound signal may be present, however, lips may not be moving; indicating reduced output from the sensors. Consider a second situation when a user is mouthing a mixing request. Herein, the user may move his/her lips, but there may be no accompanying sound. In order to identify the first and the second situations, the method may include comparing the sound signals and the sensor signals with different threshold. As an example, when the sensor signal output is below a first threshold, and the sound signal output is above a second threshold, the method may determine that the user is holding a note at a certain sound level, and not mouthing a mixing request. Accordingly, method 900 may not process the signals and not present an indication to an output device.

However, if the sensor signal output is above the first threshold, but the sound signal output is below the second threshold, the method may determine that the user is mouthing a mixing request, and the method may proceed to 912 where the method includes presenting an indication of the mixing request via an output device. For example, responsive to receiving the mixing request to change the volume, the method includes outputting an indication of the change of volume at 912. Further, the sound signal to which the requested change is volume is to be targeted is presented at 912. Furthermore, the selected output device for outputting the sound signal with the requested change in volume is presented at 912. For example, if a drummer requests a change in volume of a guitar feed to be sent to the wedge monitor, the mixing request may include all the details for the mix engineer. Method 900 returns. An example method to differentiate between a user moving his/her lips to sing, and the user moving his/her lips to mouth a mixing request is shown in FIG. 3.

Turning now to FIG. 3, an example method 300 for transmitting lip movements of a vocalist as analog signals to the mix engineer is shown. Specifically, the method includes selectively analyzing images taken from a camera, when there is lip/mouth movement with no accompanying sound.

Method 300 begins at 302 by checking if the camera(s) pointing towards artiste on stage is (are) turned ON. As explained previously, the camera may be coupled to the microphone, or may be a standalone camera placed in front of the stage. Each camera focused onto the lip or mouth and/or lip/mouth area of each of the artistes may be capable of imaging lip/mouth movement of the artistes. In some examples when the camera is coupled to the microphone, there may indicators on the microphone that indicate if the camera is ON or not. When the vocalist wishes to request for a change in personal feed from the mix engineer, the artiste may turn on the camera by pushing a button on the microphone, for example.

If the camera is not ON (e.g., "NO" at 302), then method proceeds to 304 where the camera is turned ON. The vocalist may push the button to turn ON the camera coupled to the microphone. In some examples, the camera may be turned ON remotely by the image processing unit. For example, the mix engineer may know that the vocalist has an upcoming solo piece, and in anticipation, may turn ON the camera pointing towards the lips of the vocalist. Method 300 proceeds to 306.

However, if the camera is already ON (e.g., "YES" at 302), then method 300 proceeds to 306. At 306, method 300 includes determining if the audio signal from the microphone is below a threshold level (the threshold being a non-zero positive value, for example). For example, the image processing unit may additionally receive audio signal output of the microphones, and may compare the audio levels with a threshold level. The threshold level may be determined based on ambient noise, gain settings of the amplifier, microphone settings, feedback, and the like. If the audio signal from the microphone is above the threshold level (e.g., "NO" at 306), method 300 proceeds to 318, where the method includes transmitting the audio signals to the audio interface (such as audio interface 154 of FIG. 1B, for example). As an example, during the start of a performance when audio signal transmission has not yet started, transmitting the audio signals to audio interface 318 may include beginning audio signal transmission to the audio interface at 318. As another example, in the middle of a performance, when audio signal transmission has already begun, transmitting the audio signals to the audio interface at 318 includes continuing the audio signal transmission to the audio interface. Method 300 then returns. As such, if the audio signal is above the threshold, then it indicates that the vocalist is singing and hence it may be deduced that the vocalist is not trying to communicate to the mix engineer. In some examples, the camera may be turned OFF before the method returns.

However, if the audio signal from the microphone is lower than the threshold level (e.g., "YES" at 306"), then it may indicate that the vocalist is not singing and method 300 proceeds to 308. At 308, the method 300 includes recording image data from the camera. Recording the image data may further include recording the lip movements of the vocalist and sending the recorded image data to the image processing unit. Method proceeds to 310.

At 310, method 300 includes determining if the lip movement is above a threshold. For example, when the vocalist is not singing, but is humming along with the other artistes, the lip movements may be small. However, when the vocalist is trying to communicate with the mix engineer, the vocalist may have more deliberate lip movements. The threshold may be different for each artiste and may be based on the anatomy of the lip, and the like. If the lip movements are above the threshold (e.g., "YES" at 310), then method 300 proceeds to 312. If the lip movements are smaller than the threshold (e.g., "NO" at 310) indicating that the artiste is not trying to communicate with the mix engineer, the method 300 proceeds to 318, where the audio signals are transmitted to the audio interface at 318, and then method 300 returns. In some examples, the method may stop recording and turn OFF the camera before returning.

At 312, method 300 includes converting the lip movements into analog signals. Specifically, the image data of the lip movements that are converted into electrical signals are converted into analog signals. For example, if the vocalist is mouthing the words "increase guitar volume", then the image data of the lip movements are analyzed to generate the analog and/or digital signals corresponding to the words mouthed by the vocalist. Method proceeds to 314.

At 314, method 300 includes sending the analog/digital signal to the mix engineer. Sending the analog/digital signal to the mix engineer includes relaying the message "increase guitar volume" as an audio signal though a speaker or headphone, and/or displaying the message "increase guitar volume" on a display to the mix engineer. Method 300 returns. Thus, an example method may include generating a mixing request during a live performance based on sensed mouth movement when sensed audio from a mouth is less than a threshold. Additionally or alternately, the sensed mouth movement may be generated from a sensor mounted separately from an audio sensor of a microphone. Additionally or alternatively, the method may include displaying the generated mixing request at a mixing console during the live performance. Additionally or alternatively, the sensor sensing mouth movement may include a camera. Additionally or alternatively, the camera may capture mouth movement in response to a trigger. Additionally or alternatively, the trigger may be generated by a performer during the live performance. Additionally or alternatively, the trigger may include the sensed audio being determined to be less than the threshold, the threshold being a non-zero positive value. Additionally or alternatively, the mixing request may be translated into each of an indication of a requested change in volume, an indication of a sound signal to which the requested change in volume is to be targeted, and an indication of a selected output device of one or more output devices for outputting the sound signal with the requested change in volume depending on the sensed mouth movement.

In this way, the silent sound technology integrated with the microphone may be able to selective analyze image data based on comparing the audio outputs from the microphone. An example relationship between the lip movements and the audio signal levels is shown in FIG. 4.

Turning now to FIG. 4, it shows the relationship between the lip movements as determined from camera images, and audio output of the microphones. By correlating the lip movements and the audio output, it may be possible to isolate the scenarios when the artiste is trying to communicate to the mix engineer and accordingly send the signals to the mix engineer. The first plot 402 shows the lip movement of the artiste as determined by sensors of the silent sound technology. Examples of sensors include cameras, electromyographs, ultrasound probes, and the like. The second plot 404 shows the audio output of the microphones picking up audio signals from each of the artistes. The third plot 406 shows the signal sent to the mix engineer. The dashed line 408 indicates the lip movement threshold, while dashed lines 410 and 412 indicate the upper and lower thresholds of the audio output. For each plot, time is depicted along the x (horizontal) axis while values of each respective parameter are depicted along the y (vertical) axis.

At time t0, the camera pointing towards the artiste of interest (say, a vocalist, drummer, guitarist, and the like) may be turned ON. Specifically, the camera may be coupled to the microphone, and the camera may be positioned so that the lips of the artiste are the point of focus of the camera. Once the camera is turned ON, the lip movements are captured by the camera. The image data is analyzed and the lip movements in the image data are converted into electrical signals shown in plot 402. Between t0 and t1, the lip movements (plot 402) remain higher than the threshold (dashed line 408) indicating that the artiste is deliberately moving his/her lips. The lip movement (plot 402) is compared with the audio output (plot 404) from the microphone. Correlation between the lip movements and the audio output may indicate that the artiste is singing. Between t0 and t1, the audio output of the signal lies outside the threshold band in between the upper threshold level (dashed line 410), and the lower threshold level (dashed line 412). This may indicate that the fluctuations in the audio output are caused by the artiste singing, for example. Based on the determination that the lip movements are accompanied by audio output, it may be determined that the artiste is singing. Therefore, it may not be necessary to analyze the lip movements, and send signals to the mix engineer. Accordingly, the signal to the mix engineer (plot 406) is OFF.

However, at t1, the lip movements (plot 402) continue to remain above the threshold (dashed line 408), but the audio output (plot 404) is reduced. Herein, the audio output levels are within the threshold band between the upper threshold level (dashed line 410), and the lower threshold level (dashed line 412) indicating that the audio output from the artiste is decreased. This may indicate that the artiste is mouthing words to communicate with the mix engineer. Accordingly, the image data may be analyzed, and the analog/digital signal may be sent to the mix engineer (plot 406).

Between t1 and t2, the lip movements (plot 402) continue to remain above the threshold, and the audio output (plot 404) continues to remain below the threshold. Thus, the images from the camera are continuously analyzed between time t1 and t2, and the signal is sent to the mix engineer (plot 406). In one example, once it is determined that the lip movements are accompanied with little or no sound, the camera may continue to capture images for a threshold time, and convert the lip movements to analog signals. The analog signal may be sent to the mix engineer, after the threshold time has elapsed (at t2, for example). In this way, the artiste may be able to communicate with the mix engineer in a hands-free fashion.

Between t2 and t3, the lip movement (plot 402) is below the threshold (dashed line 408). However, during this time, the audio output (plot 404) also is reduced, indicating that the artiste has stopped singing. Thus, the signal is not sent to the mix engineer.

In this way, the audio output of the microphone may be compared with the image data from the camera mounted to determine when the artiste is singing as opposed to mouthing instructions for the mix engineer.

The artistes on stage need to be in good communication with the mix engineer throughout the performance. However, the communication between the artistes and the mix engineer may not be constant. There may be times when the artistes on stage are satisfied with the individualized audio mixing, and therefore may not communicate with the mix engineer. Nevertheless, there may be sudden instances when the audio feed may need to be changed, and the artiste may wish to communicate with the mix engineer. Thus, it may not be prudent to analyze data, and send feedback signals constantly to the mix engineer. It may be possible for the silent sound technology system to recognize certain trigger commands or signals, and begin (and end) recording/analysis upon receiving the trigger command.

Turning now to FIG. 5, an example method for processing the images from the camera upon receiving a trigger command is shown. Specifically, the method includes recognizing the trigger command to begin acquiring of image data. Subsequently, the image data may be analyzed and converted into analog signals that are delivered to the mix engineer.

Method 500 begins at 502 by checking if a trigger message or command is received. Each artiste and/or instrument may include a specific trigger command. The trigger commands for each of the artistes/instruments may be stored in memory of the silent sound system. The trigger message or command may include one or more of audio, and visual signals. As an example, the artiste may snap his/her fingers once to indicate a start trigger, and may snap twice to indicate a stop trigger. In another example, the act of turning ON the camera by the artiste may be regarded as a start trigger. Likewise, the artiste turning OFF the camera may be regarded as a stop trigger.

If the trigger message is not received at 502 (e.g., "NO" at 502), then method proceeds to 520 where the lip movement is not analyzed. In one example, not analyzing the lip movement may include not turning ON the camera. In another example, where the camera is already ON, not analyzing the lip movement may include not sending the images captured by the camera to the sensor processing unit (or image processing unit) and/or turning off the camera (e.g., stopping the camera from capturing and/or sending images). In yet another example, not analyzing the lip movement at 520 may include capturing the images of the lip movement, and not analyzing the image data at the sensor processing unit (or image processing unit). Method 500 then proceeds to 522, to continue transmitting the audio signal to the audio interface and returns to continue monitoring for a trigger message. However, if the trigger message is received at 502, then method 500 proceeds to 504. At 504, method 500 includes starting the analysis on the image data received from the camera for a threshold time. As such, the camera is focused on the lips of the artistes, and analyzing the image data includes analyzing the lip movements of the artistes. If the camera is not turned ON, then method 500 may include turning ON the camera at 506 before proceeding with the analysis at 504. In one example, the threshold time may be 5 sec. The threshold time may be different for different artistes and may be stored in memory. In some examples, the camera may continue to record images as long as there is lip movement with no accompanying sound.

At 508, the method includes converting image data of the lip movements of the artiste into analog signals. Specifically, the image data may be converted to electrical signals, and further converted into analog and/or digital signals. At 510, the method includes sending the analog and/or digital signals to the mix engineer. For example, at 512, an audio message corresponding to the lip movement may be sent to a speaker positioned near the mix engineer or to a headphone worn by the mix engineer. In some examples, the audio signal may be converted into a text message and displayed across a monitor for the mix engineer.

At 514, method 500 includes checking if a threshold time has elapsed. As mentioned earlier, the threshold time may be different for different artistes. As an example, the threshold time for a drummer may be 5 sec, whereas the threshold time for a vocalist may be 3 sec. The threshold time may be determined when the silent sound system is calibrated. For example, the drummer may be slow speaker, and hence a longer threshold time may be set for the drummer compared the vocalist who may be a fast speaker. In another example, once the signal has been delivered to the mix engineer, the threshold time may be considered elapsed. In yet another example, the threshold time may be considered elapsed when the artiste gives the stop trigger. If threshold time has not elapsed (e.g., "NO" at 514), then method 500 proceeds to 516 where the lip movements are continued to be analyzed, and the method returns to 514. However, if threshold time has elapsed (e.g., "YES" at 514), then method 500 proceeds to 518 where the camera is tuned OFF, and the analysis of the lip movements is terminated, and the method returns. In this way, the artiste may be able to selectively turn ON and OFF the silent sound technology.

To elucidate further, an example relationship between trigger commands, and analysis of images is shown in FIG. 6. Turning now to FIG. 6, it shows the relationship between the lip movements as determined from camera images, tuning ON and OFF of the camera, and analysis performed on image data based on trigger commands received by the system. The first plot 602 shows the lip movement of the artiste as determined by a camera coupled to microphone, for example. The second plot 604 shows the camera being turned ON and OFF, based on the trigger commands. The third plot 606 shows the image analysis performed on the image data from the camera. For each plot, time is depicted along the x (horizontal) axis while values of each respective parameter are depicted along the y (vertical) axis.

At t0, the camera is OFF (plot 604), and the image analysis is tuned OFF (plot 606). Irrespective of whether the artiste is moving his/her lips, the lip movement (602) is not detected, as the camera is OFF. As an example, the artiste may be satisfied with the personalized audio feed received from the mix engineer. However, at t1, the artiste may desire some changes to the audio mix, and may wish to communicate with the mix engineer. The artiste may give the start trigger at t1. In one example, the artiste may turn ON the camera (plot 604) at t1. Once the camera is turned ON, the lip movements of the artiste may be recorded by the camera. The lip movements may be converted to electrical signals as shown in plot 602. In addition, the image analysis may be turned ON (plot 606) indicating that the electrical signals of the lip movements are converted into audio/visual signals and sent to the mix engineer.

In one example, the time between t1 and t2 may represent the threshold time for which the system may continue recording, and analyzing the data. Once the threshold time has elapsed, the camera may be tuned OFF (plot 604). In another example, the artiste may issue a stop trigger at t2, indicating a desire to stop the communication with the mix engineer. As a result, the camera may be turned OFF at t2 (plot 604). In yet another example, the artiste may turn OFF the camera (plot 604) at t2, indicating the end of the communication.

At t2, the camera is turned OFF (plot 604); the image analysis is additionally turned OFF (plot 606). Thus, the lip movements (plot 602) of the artiste are no longer analyzed. In this way, the artiste may selectively turn ON the system to communicate with the mix engineer, and further turn OFF the system at the end of the communication. The advantage of triggering the system ON and OFF is that the artiste is in control of the communication, and the artiste can discretely communicate with the mix engineer as and when needed.

Thus, an example method includes generating a mixing request during a live performance based on sensed mouth movement when sensed audio from the mouth is less than a threshold. Additionally or alternatively, the sensed mouth movement may be generated from a sensor mounted separately from an audio sensor of a microphone. Additionally or alternatively, the method may include displaying the generated mixing request at a mixing console during the live performance. Additionally or alternatively, the sensor sensing mouth movement may include a camera. Additionally or alternatively, the camera may capture mouth movement in response to a trigger. Additionally or alternatively, the trigger may be generated by a performer during the live performance. Additionally or alternatively, the trigger may include the sensed audio being determined to be less than the threshold, the threshold being a non-zero positive value. Additionally or alternatively, the mixing request may be translated into each of an indication of a requested change in volume, an indication of a sound signal to which the requested change in volume is to be targeted, and an indication of a selected output device of the one or more second output devices for outputting the sound signal with the requested change in volume depending on the sensed mouth movement.

During stage performances when multiple artistes communicate with the mix engineer, it may be confusing for the mix engineer. The silent sound system may lend a hand to the mix engineer by prioritizing the signals coming from the artistes, and relaying the signals with the highest priority first, followed by the other signals. For example, an artiste using an in-ear monitoring, may require a lower monitoring volume that an artiste using a wedge monitor. If the artiste with the in-ear monitoring, and the artiste with the wedge monitor both request for lowering the volume at the same time, the system may treat the request from artiste with the in-ear monitoring as a higher priority request. As such, loud signals close to the ears can be more damaging. Subsequently, the request from the artiste with the in-ear monitoring may be sent to the mix engineer first, followed by the signal from the artiste with the wedge monitor, for example. An example method is shown in FIG. 7.

Turning now to FIG. 7, an example method 700 includes receiving signals from multiple artistes, and prioritizing the delivery of the signals to the mix engineer, based on certain conditions. Method 700 begins at 702, where the lip movements of artistes on stage are converted to analog signals. As such, a camera coupled to a microphone may be image the lip movement of the artiste, and the lip movements may be converted to analog signals as described previously. The image data from each of the camera may be sent to the image processing unit. The image processing unit may be able to keep track of the image data, and the source of the image data. The image processing unit may additionally receive an identifier identifying the artiste or instrument. For example, an identifier "number 1" may correspond to a vocalist, "number 2" may refer to the drummer, and so on.

As a detailed example, artiste 1 may mouth the words "increase volume", artiste 2 may mouth the words "decrease volume", and artiste 3 may mouth the words "increase gain". Method 700 includes analyzing each the lip movements and deciphering each of the signals. In addition, method 700 includes matching the signal with the source. For example, at 704, method 700 includes matching that the signal "increase volume" originated from artiste 1. Likewise, at 706, method 700 includes matching that the signal "decrease volume" with artiste 2. Similarly, at 708, method 700 includes matching that the signal "increase gain" with artiste 3. Method proceeds to 710.

At 710, method 700 includes prioritizing the analog signals based on the certain conditions, and transmitting the signals to the mix engineer accordingly. The conditions may include type of audio component, type of monitor, distance from the monitor, position on stage, an identity of a user, and the like. For example, the identity may indicate the user or artiste, the user's status in the group, the user's role in the group, and so on. The analog signal may be prioritized based on which user is mouthing the mixing request. To elaborate, in a live performance, the artistes on stage may include one or more of a drummer, a vocalist, a pianist, a guitarist, and the like. For example, artiste 1 may be a drummer with a wedge monitor, artiste 2 may be a vocalist using an in-ear monitor, and artiste 3 may be a guitarist with a wedge monitor. Since the vocalist is using an in-ear monitor, a request to decrease volume (706) received from the vocalist may be assigned a higher priority over the "increase volume" request received from the drummer, for example. It is typically harder for the drummer to hear the audio signals over the drums, and hence the request to increase volume from the drummer may be assigned a higher priority over the "increase gain" request from the guitarist, for example. Thus, the analog signals delivered to the mix engineer may be sequenced with the signal with the highest priority being delivered first, followed by the rest of the signals. For example, "ARTISTE 2—DECREASE VOLUME" may be delivered first, followed by "ARTISTE 1—INCREASE VOLUME", and lastly "ARTISTE 3—INCREASE GAIN". In this way, the mix engineer may be able to receive the prioritized signals based on the identity of the artiste, thereby making it easier for the mix engineer to attend to the needs of the artiste in an effective manner.

As another example, an artiste in a group of artistes performing on stage may be identified as a lead artiste, and signals arising from the lead artiste may be given priority over the signals generated from the other artistes in the group. To elucidate further, a vocalist may be the lead artiste in a band, and accordingly, the mixing request from the vocalist may be identified as a high priority signal. In yet another example, one of the group of artistes may be identified as a lead artiste based on the role or status of the artiste in the group at any given time. For example, during a solo piece by the drummer, the drummer may be identified as the lead artiste, and thus, mixing requests from the drummer may be regarded with higher priority over mixing requests from other artistes. However, at other times when a guitarist has a solo piece, the mixing request from the guitarist may be regarded with higher priority over mixing requests from other artistes including the drummer, for example. In this way, the mix engineer may be able to receive the prioritized signals based on the identity of the artiste, thereby making it possible for the mix engineer to attend to the needs of the lead artiste in a timely manner, before addressing the requests from the other artistes.

To elucidate further, map 800 of FIG. 8 shows an example relationship between the signals received from multiple artistes, and the prioritization of the signals before sending them to the mix engineer. The first plot 802 shows the lip movement signals from artiste 1, the second plot 804 shows the lip movement signal from artiste 2, and the third plot 806 shows the lip movement signal from artiste 3. As explained in FIG. 7, artiste 1 may be artiste 1 may be a drummer, artiste 2 may be a vocalist, and artiste 3 may be a guitarist.

At t0, artiste 3 may begin moving his or her lips without making any sound. The camera may be tuned ON and images may be captured between t0 and t3. Subsequently, the lip movements (plot 806) may be captured by the camera and further analyzed. Upon analysis of the lip movements of artiste 3, it may be deduced that the artiste 3 is requesting to communicate the message "increase gain" to the mix engineer.

However, at t1, artiste 1 may begin to move his/her lips without making any sound. As described before, the lip movements (plot 802) may be analyzed between t1 and t3, and it may be determined that the artiste is requesting to communicate the message "increase volume" to the mix engineer.

At t2, artiste 2 may request a change in audio feed by mouthing the words "decrease volume", which is then images by the camera and translated into analog signals. Thus, the artistes 1, 2, and 3 may be trying to communicate to the mix engineer almost at the same time. At t4, when the lip movements by artiste 2 (plot 804) ends. Between t4 and t5, the signals may be prioritized. As explained earlier, artiste 1 may be a drummer with a wedge monitor, artiste 2 may be a vocalist using an in-ear monitor, and artiste 3 may be a guitarist with a wedge monitor. The vocalist's request to decrease volume (plot 804) may be assigned the first priority, followed by the drummer's request to increase volume, and then followed by the guitarist's request to increase gain. Thus, between t5 and t6, the vocalist's request (artiste 2) is transmitted to the mix engineer. Then, between t7 and t8, the drummer's request (artiste 1) is transmitted to the mix engineer. Lastly, between t9 and t10, the guitarist's request (artiste 3) is transmitted to the mix engineer. As such, the mix engineer may be able to change the audio feeds as per request and may transmit the audio signal feed back to the artistes' monitor system.

Thus, an example sound mixing device may include an audio interface configured to be coupled to a plurality of audio detection devices for receiving sound signals from each of the plurality of audio detection devices, each of the plurality of audio detection devices being associated with a sound source, a sensor interface configured to be coupled to a plurality of sensors, each of the plurality of sensors detecting user movement corresponding to a message mouthed by an associated user, a processor, a sensor processing unit comprising instructions executable by the processor to determine a mixing request from each of a plurality of users, for each user of the plurality of users, the mixing request for that user being determined based on signals received from the one or more sensors associated with that user, and the sensor processing unit further comprising instructions executable to prioritize each of the mixing requests from the plurality of users based on one or more of a requested adjustment indicated by the mixing request, a user providing the mixing request, and a target of the requested adjustment for the mixing request, an output interface configured to be coupled to one or more first output devices and one or more second output devices, the output interface receiving feedback signals from the sensor processing unit indicating the mixing request for each of the plurality of users for presenting the mixing request via the one or more first output devices according to the prioritization of the mixing requests, and the output interface receiving the sound signals from each of the one or more audio detection devices for outputting via the one or more second output devices; and a mixing interface comprising one or more user inputs for selecting adjustments to signals output by the one or more second output devices based on each of the mixing requests, the mixing interface coupled to the output interface and configured to transmit instructions indicating the adjustments to the signals output by the one or more second output devices. Additionally or alternatively, the one or more audio detection devices may include a microphone and the one or more sensors may comprise a camera embedded in or coupled to the microphone. Additionally or alternatively, determining the mixing request for each user may comprise detecting user movement from a selected sensor while an amplitude of a sound signal from the plurality of audio detection devices associated with the selected sensor is below a threshold.

In this way, artistes on stage may be able to communicate a mixing request with the sound engineers who are off-stage during a live performance. A technical effect of integrating a sensor to sense lip movement with an audio sensor, is that the artistes may be able to mouth a mixing request from stage and the mixing request may be directly delivered to a mixing console, thus offering a way for the artistes to communicate with the sound engineers without using distracting hand waving gestures.

The systems and methods described above provide for a method, comprising generating a mixing request during a live performance based on sensed mouth movement when sensed audio from the mouth is less than a threshold. In a first example of the method, the sensed mouth movement may be generated from a sensor mounted separately from an audio sensor of a microphone. A second example of the method optionally includes the first example, and further includes displaying the generated mixing request at a mixing console during the live performance. A third example of the method optionally includes one or more of the first and the second example, and further includes wherein the sensor sensing mouth movement includes a camera. A fourth example of the method optionally includes one or more of the first through the third example, and further includes wherein the camera captures mouth movement in response to a trigger. A fifth example of the method optionally includes one or more of the first through the fourth example, and further includes wherein the trigger is generated by a performer during the live performance. A sixth example of method optionally includes one or more of the first through the fifth example, and further includes wherein the trigger includes the sensed audio being determined to be less than the threshold, the threshold being a non-zero positive value. A seventh example of method optionally includes one or more of the first through the sixth example, and further includes wherein the mixing request is translated into each of an indication of a requested change in volume, an indication of a sound signal to which the requested change in volume is to be targeted, and an indication of a selected output device of the one or more second output devices for outputting the sound signal with the requested change in volume depending on the sensed mouth movement.

The systems and methods described above also provide for a signal mixing device comprising an audio interface configured to be coupled to one or more audio detection devices for receiving sound signals from each of the one or more audio detection devices, a sensor interface configured to be coupled to one or more sensors, the one or more sensors detecting user movement corresponding to a message mouthed by a user, a processor, a sensor processing unit comprising instructions executable by the processor to determine a mixing request from the user corresponding to the message mouthed by the user, the mixing request being determined based on signals received from the one or more sensors, an output interface configured to be coupled to one or more first output devices and one or more second output devices, the output interface receiving feedback signals from the sensor processing unit indicating the mixing request for presenting the mixing request via the one or more first output devices, and the output interface receiving the sound signals from each of the one or more audio detection devices for outputting via the one or more second output devices, and a mixing interface comprising one or more user inputs for selecting adjustments to signals output by the one or more second output devices based on the mixing request, the mixing interface coupled to the output interface and configured to transmit instructions indicating the adjustments to the signals output by the one or more second output devices. In a first example of the signal mixing device, the device may additionally or alternatively include wherein the one or more audio detection devices includes a microphone and the one or more sensors comprises a camera embedded in or coupled to the microphone. A second example of the signal mixing device optionally includes the first example, and further includes wherein the sensor processing unit further comprises instructions executable by the processor to selectively transmit instructions for operating each of the one or more sensors based on a trigger. A third example of the signal mixing device optionally includes one or more of the first and the second examples, and further includes wherein the sensor processing unit further comprises instructions executable to selectively determine the mixing request from the user based on a trigger. A fourth example of the A fourth example of the surround view system optionally includes one or more of the first through the third examples, and further includes optionally includes one or more of the first through the third examples, and further includes wherein determining the mixing request comprises detecting user movement from a selected sensor while an amplitude of a sound signal from the one or more audio detection devices associated with the selected sensor is below a threshold. A fifth example of the signal mixing device optionally includes one or more of the first through the fourth examples, and further includes wherein the user movement comprises one or more of lip movement and neck muscle movement, and wherein determining the mixing request comprises comparing the user movement to a database of stored user movements to determine one or more of words, phrases, and phonemes associated with the detected user movement. A sixth example of the signal mixing device optionally includes one or more of the first through the fifth examples, and further includes wherein the sensor processing unit further comprises instructions executable to prioritize signals received from the one or more sensors based on one or more of the sound signals received from the one or more audio detection devices, a determined mixing request indicated by the signals from the one or more sensors, and a user associated with the one or more sensors. A seventh example of the signal mixing device optionally includes one or more of the first through the sixth examples, and further includes wherein the mixing request comprises an indication of a requested change in volume, an indication of a sound signal to which the requested change in volume is to be targeted, and an indication of a selected output device of the one or more second output devices for outputting the sound signal with the requested change in volume. An eighth example of the signal mixing device optionally includes one or more of the first through the seventh examples, and further includes wherein the one or more second output devices comprises one of an audience-facing speaker and an in-ear monitor speaker.

The systems and methods described above also provide for a signal mixing device comprising an audio interface configured to be coupled to a plurality of audio detection devices for receiving sound signals from each of the plurality of audio detection devices, each of the plurality of audio detection devices being associated with a sound source, a sensor interface configured to be coupled to a plurality of sensors, each of the plurality of sensors detecting user movement corresponding to a message mouthed by an associated user, a processor, a sensor processing unit comprising instructions executable by the processor to determine a mixing request from each of a plurality of users, for each user of the plurality of users, the mixing request for that user being determined based on signals received from the one or more sensors associated with that user, and the sensor processing unit further comprising instructions executable to prioritize each of the mixing requests from the plurality of users based on one or more of a requested adjustment indicated by the mixing request, an identity of a user providing the mixing request, and a target of the requested adjustment for the mixing request, an output interface configured to be coupled to one or more first output devices and one or more second output devices, the output interface receiving feedback signals from the sensor processing unit indicating the mixing request for each of the plurality of users for presenting the mixing request via the one or more first output devices according to the prioritization of the mixing requests, and the output interface receiving the sound signals from each of the one or more audio detection devices for outputting via the one or more second output devices, and a mixing interface comprising one or more user inputs for selecting adjustments to signals output by the one or more second output devices based on each of the mixing requests, the mixing interface coupled to the output interface and configured to transmit instructions indicating the adjustments to the signals output by the one or more second output devices. In a first example of the signal mixing device, the device may additionally or alternatively include wherein the one or more audio detection devices includes a microphone and the one or more sensors comprises a camera embedded in or coupled to the microphone. A second example of the signal mixing device optionally includes the first example, and further includes wherein determining the mixing request for each user comprises detecting user movement from a selected sensor while an amplitude of a sound signal from the plurality of audio detection devices associated with the selected sensor is below a threshold.

In another representation, a method of presenting feedback of mixing requests via a signal mixing device is provided. The method may include receiving sound signals from one or more audio detection devices, receiving sensor signals from one or more sensor devices, each sensor device associated with one of the one or more audio detection devices, and each sensor device configured to detect user movement associated with mouthing one or more messages, determining a mixing request from a user based on the received sensor signals, the mixing request corresponding to a message mouthed by a user, and presenting an indication of the mixing request via an output device of the signal mixing device. In a first example of the method, the method may further include operating the one or more sensor devices based on a trigger command from the user. A second example of the method optionally includes the first example, and further includes wherein the determining includes correlating the received sensor signals with the sound signals, and processing the sensor signals based on the correlation. A third example of the method optionally includes one or more of the first and the second example, and further includes wherein the correlation includes comparing at least one of the received sensor signals with a first threshold, and comparing at least one of the sound signals with a second threshold, wherein the at least one of the received sensor signals and the at least one of the sound signals correspond to the same user. A fourth example of the method optionally includes one or more of the first through the third example, and further includes wherein the first threshold is different from the second threshold. A fifth example of the method optionally includes one or more of the first through the fourth example, and further includes prioritizing signals received from the one or more sensors based on one or more of the sound signals received from the one or more audio detection devices, a determined mixing request indicated by the signals from the one or more sensors, and a user associated with the one or more sensors. A sixth example of the method optionally includes one or more of the first through the fifth example, and further includes wherein the mixing request comprises an indication of a requested change in volume, an indication of a sound signal to which the requested change in volume is to be targeted, and an indication of a selected output device of the one or more second output devices for outputting the sound signal with the requested change in volume. A seventh example of the method optionally includes one or more of the first through the fifth example, and further includes responsive to receiving the mixing request, outputting, via one or more of a display device and a speaker, an indication of the change in volume, the sound signal to which the requested change in volume is to be targeted, and the selected output device for outputting the sound signal with the requested change in volume.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the signal mixing device, the silent sound technology system, and the sound mixing system described with reference to FIGS. 1A, 1B, and 2. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method, comprising:
sensing a mouth movement of a user by a sensor communicatively connected to a sensor processing unit;
detecting audio from the mouth of the user by an audio detection device;
generating, at the sensor processing unit, a mixing request from the user during a live performance based on the sensed mouth movement when the audio from the mouth of the user is detected to be less than a threshold, the mixing request including one or more of a requested change to a sound signal associated with the live performance, an indication of the sound signal to which the requested change is targeted, and an indication of a selected output device for outputting the sound signal with the requested change.

2. The method of claim 1, wherein the sensed mouth movement is generated from the sensor mounted separately from the audio detection device of a microphone, the audio detection device communicatively connected to the sensor processing unit.

3. The method of claim 1, further comprising displaying the generated mixing request at a mixing console during the live performance.

4. The method of claim 1, wherein the sensor sensing mouth movement includes a camera.

5. The method of claim 4, wherein the camera captures mouth movement in response to a trigger.

6. The method of claim 5, wherein the trigger is generated by a performer during the live performance.

7. The method of claim 5, wherein the trigger includes the sensed audio being determined to be less than the threshold, the threshold being a non-zero positive value.

8. The method of claim 7, further comprising: translating the mixing request into each of an indication of a requested change in volume, an indication of the sound signal to which the requested change in volume is to be targeted, and an indication of the selected output device of one or more output devices for outputting the sound signal with the requested change in volume depending on the sensed mouth movement.

9. A signal mixing device comprising:
an audio interface configured to be coupled to one or more audio detection devices for receiving sound signals from each of the one or more audio detection devices;
a sensor interface configured to be coupled to one or more sensors, the one or more sensors detecting user movement corresponding to a message mouthed by a user;
a processor;
a sensor processing unit comprising instructions executable by the processor to determine a mixing request from the user corresponding to the message mouthed by the user, the mixing request being determined based on signals received from the one or more sensors;
an output interface configured to be coupled to one or more first output devices and one or more second output devices, the output interface receiving feedback signals from the sensor processing unit indicating the mixing request for presenting the mixing request via the one or more first output devices, and the output interface receiving the sound signals from each of the one or more audio detection devices for outputting via the one or more second output devices; and
a mixing interface comprising one or more user inputs for selecting adjustments to signals output by the one or more second output devices based on the mixing request, the mixing interface coupled to the output interface and configured to transmit instructions indicating the adjustments to the signals output by the one or more second output devices.

10. The signal mixing device of claim 9, wherein the one or more audio detection devices includes a microphone and the one or more sensors comprises a camera embedded in or coupled to the microphone.

11. The signal mixing device of claim 9, wherein the sensor processing unit further comprises instructions executable by the processor to selectively transmit instructions for operating each of the one or more sensors based on a trigger.

12. The signal mixing device of claim 9, wherein the sensor processing unit further comprises instructions executable to selectively determine the mixing request from the user based on a trigger.

13. The signal mixing device of claim 9, wherein the mixing request is determined by detecting user movement from a selected sensor while an amplitude of a sound signal from the one or more audio detection devices associated with the selected sensor is below a threshold.

14. The signal mixing device of claim 13, wherein the user movement comprises one or more of lip movement and neck muscle movement, and wherein determining the mixing request comprises comparing the user movement to a database of stored user movements to determine one or more of words, phrases, and phonemes associated with the detected user movement.

15. The signal mixing device of claim 9, wherein the sensor processing unit further comprises instructions executable to prioritize signals received from the one or more sensors based on one or more of the sound signals received from the one or more audio detection devices, a determined mixing request indicated by the signals from the one or more sensors, and a user associated with the one or more sensors.

16. The signal mixing device of claim 9, wherein the mixing request comprises an indication of a requested change in volume, an indication of a sound signal to which the requested change in volume is to be targeted, and an indication of a selected output device of the one or more second output devices for outputting the sound signal with the requested change in volume.

17. The signal mixing device of claim 16, wherein the one or more second output devices comprises one of an audience-facing speaker and an in-ear monitor speaker.

18. A signal mixing device comprising:
an audio interface configured to be coupled to a plurality of audio detection devices for receiving sound signals from each of the plurality of audio detection devices, each of the plurality of audio detection devices being associated with a sound source;
a sensor interface configured to be coupled to a plurality of sensors, each of the plurality of sensors detecting user movement corresponding to a message mouthed by an associated user;
a processor;
a sensor processing unit comprising instructions executable by the processor to determine a mixing request from each of a plurality of users, for each user of the plurality of users, the mixing request for that user being determined based on signals received from one or more selected sensors of the plurality of sensors, the one or more selected sensors being associated with that user, and the sensor processing unit further comprising instructions executable to prioritize each of the mixing requests from the plurality of users based on one or more of a requested adjustment indicated by the mixing request, an identity of a user providing the mixing request, and a target of the requested adjustment for the mixing request;
an output interface configured to be coupled to one or more first output devices and one or more second output devices, the output interface receiving feedback signals from the sensor processing unit indicating the mixing request for each of the plurality of users for presenting the mixing request via the one or more first output devices according to the prioritization of the mixing requests, and the output interface receiving the sound signals from each of the plurality of audio detection devices for outputting via the one or more second output devices; and
a mixing interface comprising one or more user inputs for selecting adjustments to signals output by the one or more second output devices based on each of the mixing requests, the mixing interface coupled to the output interface and configured to transmit instructions indicating the adjustments to the signals output by the one or more second output devices.

19. The signal mixing device of claim 18, wherein the plurality of audio detection devices includes a microphone and the one or more selected sensors comprises a camera embedded in or coupled to the microphone.

20. The signal mixing device of claim 18, wherein determining the mixing request for each user comprises detecting user movement from a first selected sensor of the one or more selected sensors while an amplitude of a sound signal from the plurality of audio detection devices associated with the first selected sensor is below a threshold.

* * * * *